United States Patent [19]

Rinehart

[11] 4,053,679

[45] Oct. 11, 1977

[54] CHEMICALLY STRENGTHENED OPAL GLASS

[75] Inventor: Dale W. Rinehart, Natrona Heights, Pa.

[73] Assignee: PPG Industries, Inc., Pittsburgh, Pa.

[21] Appl. No.: 706,661

[22] Filed: July 19, 1976

Related U.S. Application Data

[63] Continuation-in-part of Ser. No. 605,108, Aug. 15, 1975, Pat. No. 4,015,045, which is a continuation-in-part of Ser. No. 432,006, Jan. 9, 1974, abandoned.

[51] Int. Cl.² .................. B32B 17/00; C03C 21/00
[52] U.S. Cl. ............................ 428/410; 428/218; 106/52; 65/30 E; 65/30 R
[58] Field of Search ............... 428/410, 218; 106/52; 65/30 E, 30 R

[56] References Cited

U.S. PATENT DOCUMENTS

| | | | |
|---|---|---|---|
| 3,357,876 | 12/1976 | Rinehart | 65/30 E |
| 3,485,647 | 12/1969 | Harrington | 65/30 E |
| 3,485,702 | 12/1969 | Mochel | 65/30 E |
| 3,498,773 | 3/1970 | Grubb | 65/30 E |
| 3,498,801 | 3/1970 | Keul | 106/39.7 |
| 3,778,335 | 12/1973 | Boyd | 65/30 E |
| 3,790,430 | 2/1974 | Mochel | 65/30 E |
| 3,907,577 | 9/1975 | Kiefer | 65/30 E |

Primary Examiner—Ellis Robinson
Attorney, Agent, or Firm—Dennis G. Millman

[57] ABSTRACT

Opal glasses capable of being chemically strengthened by ion exchange with potassium are comprised of (by weight on the oxide basis):

| Composition | Percent by Weight |
|---|---|
| $SiO_2$ | 34 – 60 |
| $Na_2O$ | 6 – 23 |
| $K_2O$ | 0 – 15 |
| $(Na_2O + K_2O)$ | 18 – 26 |
| $Al_2O_3$ | 0 – 18 |
| $ZrO_2$ | 0 – 20 |
| $(Al_2O_3 + ZrO_2)$ | 4 – 21 |
| $P_2O_5$ | 7 – 20 |
| $CaO$ | 0 – 9 |
| $SrO$ | 0 – 9 |
| $(CaO + SrO)$ | 2 – 9 |
| $Li_2O$ | Less than 0.1 |

16 Claims, No Drawings

4,053,679

CHEMICALLY STRENGTHENED OPAL GLASS

CROSS-REFERENCE TO RELATED APPLICATIONS

This application is a continuation-in-part of application Ser. No. 605,108, filed Aug. 15, 1975 now U.S. Pat. No. 4,015,045, which was a continuation-in-part of application Ser. No. 432,006, filed Jan. 9, 1974, now abandoned. This application is also related in subject matter to applicant's copending application Ser. No. 706,660, filed on even data herewith, entitled "Ion Exchange Strengthened Glass Containing $P_2O_5$".

BACKGROUND OF THE INVENTION

This invention relates to a class of glass compositions which spontaneously undergo opalization upon melting and forming and which are capable of being strengthened by a conventional surface ion exchange treatment. Such glasses have potential application for use as break-resistant tableware, containers for products such as cosmetics and pharmaceuticals, decorative panels and tile, architectural members, electrical insulators, and many other products.

The terms "opal," "opalized," or "opalescence" as used herein are intended to refer to the propensity of certain glasses to scatter a substantial portion of the light passing therethrough so as to render visibility through the glass essentially nil. Opalescence may vary by degrees from a cloudy iridescence to a nearly opaque white, and is dependent upon the thickness of a given piece. Observations of the degree of opalescence herein are based on samples (plates and/or rods) having thicknesses compmensurate with at least some of the above-noted proposed applications—about ⅛ inch (3 millimeters) to about ¼ inch (6 millimeters).

Fluorine has long been used as an opalizing agent in glass, but its use has been discouraged by air pollution problems associated therewith. Proposed substitutes for fluorine have been disclosed, for example, in the following:

U.S. Pat. No. 2,559,805— Stookey
U.S. Pat. No. 3,498,801 — Keul
U.S. Pat. No. 3,709,705 — Hagedorn
U.S. Pat. No. 3,647,490 — Pirooz
U.S. Pat. No. 3,661,601 — Dambaugh et al.
W. German Application No. P 23 13 074.7

The Stookey patent mentions calcium phosphate and barium phosphate as opacifiers, but because of various drawbacks, teaches the use of only a specific barium phosphate composition. In the Keul patent, $P_2O_5$ and CaO serve as the opalizers. $B_2O_3$ is the primary opalizing agent in the Hagedorn and Pirooz patents. Dumbaugh et al. disclose the combination of F, $B_2O_3$, and CaO to be an active opalizer. The West German application employs $B_2O_3$, $K_2O$ and $P_2O_5$ as the opalizing ingredients. However, none of these prior opal glasses is intended for chemical strengthening.

Chemical strengthening (or "chemical tempering") of glass involves an exchange of ions near the surface of the glass article with ions from an external source, typically a molten inorganic salt bath, the object being the generation of a zone near the surface of the glass which is in a state of compression relative to the interior portions of the glass. There are two types of ion exchange strengthening which differ substantially in theory and operation. The first type of ion exchange treatment is carried out above the strain point of the glass and has as its object the alteration of the glass composition at the surface so as to lower the thermal coefficient of expansion in the surface layer. As the glass is cooled, a compressive stress develops at the surface due to the expansion differential. This approach was taught by Hood and Stookey in U.S. Pat. No. 2,779,136. The second type of ion exchange strengthening is characterized by treatment below the strain point of the glass, wherein surface compression is generated by substituting large ions from an external source (e.g., a molten salt bath) for smaller ions in the glass. Typically, the substitution is of sodium or potassium for lithium in the glass, or of potassium for sodium in the glass. The below-the-strain-point technique was first taught by Weber in U.S. Pat. No. 3,218,220.

Of the two types of ion exchange strengthening, the second (below the strain point) type is preferred for large-scale commercial use. This is because maintaining the glass below its strain temperature avoids causing undesirable distortion defects in the glass. Furthermore, since it is costly to include lithium in a glass as a batch ingredient, and because greater strengthening can generally be achieved, it is desirable that sodium, rather than lithium, be the ion in the glass which is replaced. In that case, the larger ion which enters the glass is most advantageously potassium. Hence, this invention is directed specifically to the improvement of ion exchange strengthening processes which involve replacing sodium with potassium below the strain point of the glass.

Conventional soda-lime-silica flat glass compositions can be strengthened by ion exchange, but the greater length of time required to produce a significant compression layer depth is incompatible with many high volume commercial operations. For this reason, special glass compositions have been developed which have greatly enhanced ion exchange properties, chief amoung which are the $Al_2O_3$ and/or $ZrO_2$ containing glasses disclosed by Mochel in U.S. Pat. Nos. 3,485,702; 3,752,729; and 3,790,430. Variations of these alumina or zirconia containing glasses may be seen in many U.S. Patents including the following:

U.S. Pat. No. 3,357,876 — Rinehart
U.S. Pat. No. 3,433,611 — Saunders et al.
U.S. Pat. No. 3,481,726 — Fischer et al.
U.S. Pat. No. 3,485,647 — Harrington
U.S. Pat. No. 3,498,773 — Grubb et al.
U.S. Pat. No. 3,778,335 — Boyd
U.S. Pat. No. 3,844,754 — Grubb et al.
U.S. Pat. No. 3,772,135 — Hara et al.

None of the above-cited patents discloses an ion exchange glass which is opalized, although U.S. Pat. No. 3,485,647 to Harrington mentions a "slight opal" appearance in two samples of his ion exchange glasses. Not only is the opalescence of the Harrington glasses only slight, but the glasses are intended for use in the less desirable type of ion exchange process where lithium ions replace sodium ions above the strain point of the glass.

A different type of strengthened opal glasses are disclosed in U.S. Pat. No. 3,907,577 to Kiefer et al., but they are not strengthened by ion exchange with an external source of ions as in the present invention. Rather, Kiefer thermally induces crystal formation at the glass surface by a migration of ions within the glass, and the crystal layer produced creates a compression layer at the surface. Kiefer's glasses require the inclusion of lithium for crystal formation, which renders them less desirable for ion exchange treatment for the economic and strength considerations previously mentioned. A lithium-containing glass is furthermore not suitable for exchanging sodium ions in the glass with a potassium exchange bath because the lithium ions would tend to accumulate in the bath, thereby reducing its ion exchanging effectiveness. Although the Kiefer patent does mention the effect of $P_2O_5$, CaO, and BaO on the opacity of his glasses, he does not teach the class of ion exchange glass to which the present invention is directed.

While the specially adapted ion exchange glass compositions of the prior art greatly reduce the amount of time required for ion exchange treatment compared to conventional soda-lime-silica glass, their commercial use remains limited to low volume specialty items because treatment times are still impractically long for many applications. Moreover, many of the prior art compositions have melting temperatures considerably higher than soda-lime-silica glass and thus are not readily adapted for use in existing melting and forming facilities. Thus, it would be highly desirable to have glass compositions available which are not only opalized, but could also be more rapidly strengthened by exchange treatment with potassium and have melting temperatures more in line with ordinary soda-lime-silica glass. Other factors such as transparency, chemical durability, and the cost of raw materials also must be taken into consideration.

Substantial progress toward the above-noted goals for clear glasses was attained by the glass compositions disclosed in parent application Ser. No. 605,108, the disclosure of which is hereby incorporated by reference. The present invention represents an even greater improvement over those glasses, particularly in regard to the speed with which a deep compression layer can be created in the glasses, as well as providing opalescence.

SUMMARY OF THE INVENTION

It has now has been found that opal glasses having a propensity for ion exchange with potassium may be obtained within the following compositional limits (by weight on the oxide basis):

| Composition | Broad (Substantially Opalized) | Preferred (Fully Opalized) |
|---|---|---|
| $SiO_2$ | 34 – 60 percent | 38 – 60 percent |
| $Na_2O$ | 6 – 23 percent | 10 – 18 percent |
| $K_2O$ | 0 – 15 percent | 0 – 11 percent |
| ($Na_2O + K_2O$) | 18 – 26 percent | 18 – 23 percent |
| $Al_2O_3$ | 0 – 18 percent | 4 – 18 percent |
| $ZrO_2$ | 0 – 20 percent | 0 – 10 percent |
| ($Al_2O_3 + ZrO_2$) | 4 – 21 percent | 4 – 20 percent |
| $P_2O_5$ | 7 – 20 percent | 10 – 20 percent |
| CaO | 0 – 9 percent | 0 – 9 percent |
| SrO | 0 – 9 percent | 0 – 9 percent |
| (CaO + SrO) | 2 – 9 percent | 4 – 9 percent |
| $Li_2O$ | less than 0.1 percent | less than 0.1 percent |

The composition may also include small amounts (no more than about 10 percent total) of conventional fluxing ingredients such as MgO, $TiO_2$ BaO, PbO, ZnO, and $B_2O_3$.

The glasses of the present invention develop relatively deep surface compression layers and high strengths within practical ion exchange treatment times. Furthermore, they possess generally favorable temperature-viscosity relationships for melting and forming and many show a high degree of chemical durability. They undergo spontaneous opalization (i.e., no additional heat treatment is required), and the preferred compositions attain a dense white or off-white coloration. The broad range encompasses glasses which are slightly more translucent than the preferred compositions but nevertheless may be considered essentially opalized and may be suitable, or even preferred, for some applications. Minor amounts of colorants may be added to the compositions to produce glasses in a variety of colors.

In general, it may be said that the invention is predicated on the discovery that major amounts of $P_2O_5$ plus CaO and/or SrO may be employed as an opalizing agent in alkali aluminosilicate glass, and that contrary to what might be expected, the propensity of the glass to be chemically strengthened is not decreased, and may even be enhanced.

DETAILED DESCRIPTION

The novel glass compositions of the present invention include 34 to 60 percent (by weight, on the oxide basis), preferably 38 to 60 per $SiO_2$, which is the primary glass former and is responsible for chemical durability in the glass. $Na_2O$ in the amount of 6 to 23 percent, preferably 10 to 18 percent, is present as a fluxing agent and provides the sites for subsequent ion exchange. Although an excess of $Na_2O$ can reduce the resistance of the glass to chemical attack, at least the minimum amount prescribed should be present in the glass to maintain the melting temperature of the glass at a practical level and to provide the glass with an appreciable ion exchange propensity. $K_2O$ is also desirably present in the glass as a fluxing agent. At higher concentrations, $K_2O$ can lower the strength obtained by ion exchange with potassium, but it has been found that in the range of 0 to 15 percent, preferably 0 to 11 percent, $K_2O$ actually tends to improve ion exchange characteristics. The sum of the alkali metal oxides desirably constitutes at least about 18 percent of the total weight of the glass to yield a commercially advantageous low melting temperature. The best overall glasses of the present invention contain 18 to 26 percent, preferably 18 to 21 percent, of $Na_2O$ plus $K_2O$, and the preferred glasses show a melting temperature below 2800° F. (1538° C.).

The ingredients primarily responsible for the practical, below-the-strain-point ion exchange strengthening of the novel glasses are $Al_2O_3$ and $ZrO_2$, which may be present in the combined amount of 4 to 21 percent (preferably 8 to 20 percent), including 0 to 18 percent (preferably 4 to 18 percent) $Al_2O_3$ and 0 to 15 percent $ZrO_2$. Larger amounts of $Al_2O_3$ reduce chemical durability and increase the melting temperature of the glass. $Al_2O_3$ in some cases also tends to render the glass less opalescent. The inclusion of some $ZrO_2$ is also advantageous because it lowers the melting temperature and cam improve durability.

To produce opalescene, the glass should include 7 to 20 percent (10 to 20 percent for the densest opals) $P_2O_5$ together with 2 to 9 percent (preferably 4 to 9 percent) of CaO and/or SrO. More than 20 percent $P_2O_5$ is not desirable because of its relatively high cost as a batch material and because greater amounts may adversely affect chemical durability and homogeneity of the glass. It is preferred that the glass contain just enough CaO and/or SrO to produce the desired degree of opalescence since their presence tends to reduce the depth of the compression layer produced by ion exchange and lessen the final strength attained. It has been found that producing opalescence with $P_2O_5$ and CaO and/or SrO does not depress the ion exchange propensity of these glasses; in fact, in some cases, it exceeds that of conventional clear alumina and/or zirconia containing ion exchange glasses. The inclusion of $P_2O_3$ also advantageously raises the strain point of the glass.

The glass compositions of the present invention may optionally include small amounts (no more than about 10 percent total) of other fluxing agents to further lower the melting temperature. Fluxing agents well-known to the glassmaking art include NgO, $TiO_2$, BaO, PbO, ZnO, and $B_2O_3$.

The glasses of the present invention should be essentially free of $Li_2O$, i.e., no more than about 0.1 percent by weight. When lithium is present in a glass being treated in a potassium ion exchange bath, the concentration of lithium rises in the bath, and after a period of time the bath becomes "poisoned," that is, it loses its ability to effectively exchange potassium ions in the bath for sodium ions in the glass. As a result, the rate of ion exchange will becrease and the strength obtained in the treated glass will be reduced. Thus, only a trace of lithium can be tolerated in these glasses.

Glasses within the compositional ranges prescribed above spontaneously opalize during melting and forming to produce a white or off-white color. Various known glass colorants may be included in the glasses, singly or in a multitude of combinations, to produce a wide variety of colors. Examples of such colorants are: CoO, $Cr_2O_3$, CuO, $CeO_2$, $Fe_2O_3$, $V_2O_5$, $MnO_2$, and NiO.

The following table of examples includes glasses within the scope of the present invention as well as several others included for purposes of comparison. All of the compositions shown are capable of being chemically strengthened to varying degress, but, as noted, appearances ranged from clear to fully opal. The glasses indicated as "opal" or "essentially opal" were considered suitable for conventional opal glass applications and are representative of the present invention. The example glasses were melted from laboratory batch materials including: "Supersil" sand, reagent grade sodium carbonate, aluminum hydrate, zircon sand, aluminum metaphosphate, potassium carbonate, calcium carbonate, and strontium oxide. The following batch compositions, for the glass of Example 547, is typical:

| Ingredient | Weight (grams) |
|---|---|
| "Supersil" sand | 317.1 |
| Anhydrous sodium carbonate | 230.9 |
| Aluminum hydrate | 73.6 |
| Potassium carbonate | 33.1 |
| Zircon sand ($ZrSiO_4$) | 50.8 |
| Aluminum metaphosphate | 143.8 |
| Calcium carbonate | 67.1 |

The batch ingredients were added incrementally over a period of approximately 3 hours to a 4 inch (10 centimeter) diameter platinum crucible held at about 1450° C. (higher where required). Each melt was stirred during the batch additions and for an additional period of about 15 hours during which the melt was maintained at 1450° C. Thereafter each melt was held at 1450° C. for about one more hour in a quiescent state, after which a number of rods were drawn from the melt and the remainder of the melt was cast onto a plate.

The depth of the compression layer and the strength obtained after two different ion exchange treatments in molten $KNO_3$ are reported form some of the examples. Compression layer depth was measured optically on a ground cross-sectional slice sawed from a plate of the ion-exchanged glass. Each slice was placed between cross-polaroids under a microscope, where the compression zone could be observed. Strength is reported as "Modulus of rupture" (M.O.R.) obtained by the abraded rod technique. Rods nominally 3 millimeters in diameter drawn from the glass melt were cut into approximately 2.5 inch (6.5 centimeter) lengths and heated at about 650° C. for half an hour, then cooled to room temperature overnight to anneal the rods. After ion exchange treatment, the rods are subjected to tumble abrasion be being placed in a jar containing 240 grit silicon carbide. The jar is rotated horizontally about its main axis at a speed of about 167 revolutions per minute for 30 minutes. Each abraded rod is then placed singly on a 1.5 inch (3.8 centimeter) support span and stressed to fracture with a ¾ inch (1.9 centimeter) wide load member. The load at fracture is recorded, and M.O.R. is calculated by the following formula:

$$M.O.R. = 8WL/\pi ab^2$$

where $W$ is the load at fracture, $L$ is the difference betweeen the load and support spans, $a$ is the larger diameter of the rod, and $b$ is the smaller diameter of the rod ( assuming that the rod is not perfectly circular in cross-section). Each reported $M.O.R.$ value represents the average of at least ten rods.

The annealing points given in the examples were determined by a differential thermal analysis technique. Melting temperature, defined for the purposes of this application as the temperature at which the viscosity of the glass is 100 poises, and forming temperature, defined as the temperature at which the viscosity of the glass is 10,000 poises, were both determined by a standard rotating spindle viscometer technique. Where any of the measurements were duplicated, the values shown below represent averages.

| Example no.: | 501 | 516 | 523 | 534 | 545 | 546 | 535 | 537 | 538 | 539 | 541 |
|---|---|---|---|---|---|---|---|---|---|---|---|
| Composition (% by weight): | | | | | | | | | | | |
| $SiO_2$ | 44.5 | 42.5 | 39.5 | 36.5 | 34.5 | 29.5 | 44.5 | 44.5 | 44.5 | 41.5 | 39.5 |
| $Na_2O$ | 18.0 | 18.0 | 18.0 | 18.0 | 18.0 | 18.0 | 18.0 | 18.0 | 18.0 | 17.4 | 18.0 |
| $Al_2O_3$ | 10.0 | 10.0 | 10.0 | 10.0 | 10.0 | 10.0 | 10.0 | 10.0 | 10.0 | 9.7 | 10.0 |
| MgO | 5.0 | 5.0 | 5.0 | 5.0 | 5.0 | 5.0 | — | 4.0 | 2.5 | 3.9 | — |

-continued

| | | | | | | | | | | |
|---|---|---|---|---|---|---|---|---|---|---|
| K₂O | 3.0 | 3.0 | 3.0 | 3.0 | 3.0 | 3.0 | 3.0 | 3.0 | 3.0 | 2.9 | 3.0 |
| ZrO₂ | 4.5 | 4.5 | 4.5 | 4.5 | 4.5 | 4.5 | 4.5 | 4.5 | 4.5 | 4.3 | 4.5 |
| P₂O₅ | 10.0 | 12.0 | 15.0 | 18.0 | 20.0 | 25.0 | 10.0 | 10.0 | 10.0 | 14.5 | 15.0 |
| CaO | | | | | | | 5.0 | 1.0 | 2.5 | 1.0 | 5.0 |
| TiO₂ | 5.0 | 5.0 | 5.0 | 5.0 | 5.0 | 5.0 | 5.0 | 5.0 | 5.0 | 4.8 | 5.0 |
| Appearance: | Clear-Slight Haze | Hazy | Cloudy | Very Cloudy | Essent. Opal | Opal, Mottled | Essent. Opal | Hazy | Hazy | Very Cloudy | Opal |
| Compression layer depth (Microns) after 1 hr. at 1000° F (538° C): | 75 | 85 | 100 | 115 | 130 | | 70 | | 75 | | 90 |
| M.O.R. (kg/cm²) after 1 hr. at 1000° F (538° C): | 5200 | 5400 | 5700 | 5100 | — | — | 4600 | 5000 | 5400 | 5300 | 5100 |
| after 4 hrs. at 900° F (582° C) | 6000 | 6600 | 6600 | 6100 | — | — | 5300 | — | 5700 | — | 5700 |
| Annealing point (° C): | 582 | 604 | 621 | 621 | 648 | — | 589/647 | — | — | — | — |
| Melting temperature (° C): | 1372 | — | 1342 | 1312 | 1298 | — | 1347 | — | — | — | 1335 |
| Forming temperature (° C): | 1016 | — | 1001 | 991 | 989 | — | — | — | — | — | 1007 |

| Example no.: | 542 | 547 | 548 | 552 | 553 | 556 | 561 | 564 | 567 | 568 | 569 |
|---|---|---|---|---|---|---|---|---|---|---|---|
| Composition (% by weight): | | | | | | | | | | | |
| SiO₂ | 44.5 | 44.5 | 49.5 | 38.0 | 47.5 | 49.5 | 41.5 | 52.5 | 48.5 | 44.2 | 44.5 |
| Na₂O | 18.0 | 18.0 | 18.0 | 18.0 | 18.0 | 18.0 | 18.0 | 18.0 | 18.0 | 18.0 | 18.0 |
| Al₂O₃ | 10.0 | 10.0 | 10.0 | 12.0 | 10.0 | 10.0 | 10.0 | 10.0 | 10.0 | 10.0 | 10.0 |
| MgO | 1.0 | — | — | — | — | — | — | — | — | — | — |
| K₂O | 3.0 | 3.0 | 3.0 | 3.0 | 3.0 | 3.0 | 3.0 | 3.0 | 3.0 | 3.0 | — |
| ZrO₂ | 4.5 | 4.5 | 4.5 | 4.5 | 4.5 | 4.5 | 4.5 | 4.5 | 4.5 | 4.5 | 3.0 |
| P₂O₅ | 10.0 | 15.0 | 10.0 | 18.0 | 10.0 | 7.0 | 18.0 | 7.0 | 10.0 | 15.0 | 4.5 |
| CaO | 4.0 | 5.0 | 5.0 | 4.5 | 10.0 | 8.0 | 5.0 | 5.0 | 6.0 | 5.0 | 15.0 |
| TiO₂ | 5.0 | 5.0 | 5.0 | 2.0 | 7.0 | | | | | | 5.0 |
| CuO | | | | | | | | | | 0.3 | |
| CoO | | | | | | | | | | | 0.05 |
| Appearance: | Very Cloudy | Opal | Essent. Opal | Opal | Essent. Opal | Opal | Very Cloudy | Opal | Opal | Opal (blue) | Opal (blue) |
| Compression Layer Depth (microns) after 1 hr. at 1000° F (538° C): | — | 110 | 85 | — | 80 | — | 125 | 90 | 80 | — | — |
| M.O.R. (kg/cm²) after 1 hr. at 1000° F (538° C): | 5500 | 5900 | 3500 / 6400 | 2400 | — | 6800 | 2100 | 2700 | 6300 | 5600 | |
| after 4 hrs. at 900° F (482° C): | — | 6000 | 4100 | 6900 | 3700 | — | 6500 | 3100 | 4100 | 6900 | 6500 |
| Annealing Point (° C): | — | 654 | — | — | — | — | — | — | 554 | — | 661 |
| Melting Temperature (° C): | — | 1422 | — | — | — | — | — | — | 1419 | — | 1424 |

| Example no.: | 572 | 573 | 574 | 575 | 576 | 577 | 578 | 579 | 580 | 581 | 582 | 583 |
|---|---|---|---|---|---|---|---|---|---|---|---|---|
| Composition (% by weight): | | | | | | | | | | | | |
| SiO₂ | 44.2 | 44.3 | 44.2 | 44.5 | 43.7 | 43.7 | 44.2 | 44.2 | 48.2 | 48.5 | 48.4 | 48.4 |
| Na₂O | 18.0 | 18.0 | 18.0 | 18.0 | 18.0 | 18.0 | 18.0 | 18.0 | 18.0 | 18.0 | 18.0 | 18.0 |
| Al₂O₃ | 10.0 | 10.0 | 10.0 | 10.0 | 10.0 | 10.0 | 10.0 | 10.0 | 10.0 | 10.0 | 10.0 | 10.0 |
| K₂O | 3.0 | 3.0 | 3.0 | 3.0 | 3.0 | 3.0 | 3.0 | 3.0 | 3.0 | 3.0 | 3.0 | 3.0 |
| ZrO₂ | 4.5 | 4.5 | 4.5 | 4.5 | 4.5 | 4.5 | 4.5 | 4.5 | 4.5 | 4.5 | 4.5 | 4.5 |
| P₂O₅ | 15.0 | 15.0 | 15.0 | 15.0 | 15.0 | 15.0 | 15.0 | 15.0 | 4.5 | 4.5 | 4.5 | 4.5 |
| CaO | 5.0 | 5.0 | 5.0 | 5.0 | 5.0 | 5.0 | 5.0 | 5.0 | 10.0 | 10.0 | 10.0 | 10.0 |
| CoO | | | | | | | | | 6.0 | 6.0 | 6.0 | 6.0 |
| NiO | | 0.2 | | 0.011 | 0.011 | | 0.03 | 0.03 | | 0.005 | | 0.015 |
| Cr₂O₃ | 0.3 | | | | 0.063 | 0.063 | | | 0.3 | | 0.1 | |
| CuO | | | | | | | | 0.3 | | 0.3 | | |
| MnO₂ | | | 0.3 | | | | | | | | | |
| Fe₂O₃ | | | | | 0.8 | 0.8 | | | | | | |
| Appearance: | Opal (green) | Opal (tan) | Opal (pink) | Opal (blue-gray) | Opal (gray) | Opal (gray) | Opal (blue) | Opal (green) | Opal (blue) | Opal blue | Opal (green) | Opal (blue) |
| M.O.R. (kg/cm²) after 1 hr. at 1000° F (538° C): | 5700 | 6200 | 6100 | | | | | | 2500 | | | |
| after 4 hrs. at 900° F (482° C): | 6600 | 7300 | 6800 | | | | | | 4200 | | | |

| Example No.: | 570 | 584 | 585 | 587 | 588 | 590 | 591 | 592 | 593 | 594 | 595 |
|---|---|---|---|---|---|---|---|---|---|---|---|
| Composition (% by weight) | | | | | | | | | | | |
| SiO₂ | 47.5 | 49.0 | 44.5 | 50.0 | 44.5 | 38.5 | 43.5 | 53.5 | 48.0 | 56.5 | 56.2 |
| Na₂O | 15.0 | 18.0 | 18.0 | 18.0 | 18.0 | 18.0 | 18.0 | 18.0 | 18.0 | 15.0 | 15.0 |
| Al₂O₃ | 10.0 | 10.0 | 14.5 | 4.5 | 10.0 | 10.0 | 10.0 | 10.0 | 10.0 | 10.0 | 10.0 |
| K₂O | 3.0 | 3.0 | 3.0 | 3.0 | 3.0 | 3.0 | 3.0 | 3.0 | 3.0 | 3.0 | 3.0 |
| ZrO₂ | 4.5 | — | — | 4.5 | 4.5 | 4.5 | 4.5 | 4.5 | 4.5 | 4.5 | 4.5 |
| P₂O₅ | 15.0 | 15.0 | 15.0 | 15.0 | 15.0 | 15.0 | 15.0 | 4.5 | 4.5 | 4.5 | 4.5 |
| CaO | 5.0 | 5.0 | 5.0 | 5.0 | — | 15.0 | 15.0 | 5.0 | 7.5 | 5.0 | 5.0 |
| Fe₂O₃ | | | | | | 5.0 | | 6.0 | 9.0 | 6.0 | 6.0 |
| BaO | | | | | 5.0 | | 1.0 | | | | |
| V₂O₅ | | | | | | | 1.0 | | | | |
| CuO | | | | | | | | | | | 0.3 |
| Appearance: | Opal | Opal | Opal | Opal | Cloudy | Opal (tan) | Opal (green) | Cloudy | Essent. Opal | Cloudy | Cloudy (blue) |
| Compression layer depth (microns) after 1 hr. at 1000° F (538° C): | — | 115 | 125 | 90 | — | — | — | — | — | — | — |
| M.O.R. (kg/cm²) after 1 hr. at 1000° F (538° C): | 3800 | 3600 | 4600 | 5300 | 5500 | — | 4900 | 2100 | — | — | — |
| after 4 hrs. at 900° F (482° C): | 5000 | 4000 | 5400 / 4000 | 6000 | — | 5300 | 3400 | — | — | — | — |
| Melting temperature (° C): | — | — | — | 1386 | — | — | — | — | — | — | — |

| Example no. | 596 | 599 | 600 | 601 | 602 | 603 | 604 | 605 | 606 | 609 | 610 |
|---|---|---|---|---|---|---|---|---|---|---|---|
| Composition (% by weight): | | | | | | | | | | | |
| SiO₂ | 43.5 | 43.5 | 42.5 | 44.1 | 44.3 | 44.1 | 44.2 | 44.2 | 43.9 | 54.5 | 52.5 |
| Na₂O | 18.0 | 18.0 | 18.0 | 18.0 | 18.0 | 18.0 | 18.0 | 18.0 | 18.0 | 18.0 | 18.0 |
| Al₂O₃ | 10.0 | 10.0 | 10.0 | 10.0 | 10.0 | 10.0 | 10.0 | 10.0 | 10.0 | — | 2.0 |
| K₂O | 3.0 | 3.0 | 3.0 | 3.0 | 3.0 | 3.0 | 3.0 | 3.0 | 3.0 | 3.0 | 3.0 |
| ZrO₂ | 4.5 | 4.5 | 4.5 | 4.5 | 4.5 | 4.5 | 4.5 | 4.5 | 4.5 | 4.5 | 4.5 |
| P₂O₅ | 15.0 | 15.0 | 15.0 | 15.0 | 15.0 | 15.0 | 15.0 | 15.0 | 15.0 | 15.0 | 15.0 |

-continued

| | | | | | | | | | | | |
|---|---|---|---|---|---|---|---|---|---|---|---|
| CaO | 5.0 | 6.0 | 7.0 | 5.0 | 5.0 | 5.0 | 5.0 | 5.0 | 5.0 | 5.0 | 5.0 |
| CoO | 1.0 | | | | | | | | | | |
| $Cr_2O_3$ | | | | | | | 0.015 | 0.015 | | | |
| CuO | | | | 0.1 | 0.1 | 0.3 | | | 0.3 | | |
| $MnO_2$ | | | | 0.3 | 0.1 | 0.1 | 0.3 | 0.3 | 0.3 | | |
| Appearance: | Opal (blue) | Opal | Opal | Opal (blue/green) | Opal (green) | Opal (green) | Opal (blue) | Opal (blue) | Opal (green) | Essent. Opal | Essent. Opal |
| Compression Layer Depth (microns) after 1 hr. at 1000° F (538° C): | — | 90 | 80 | — | — | — | — | — | — | 65 | 70 |
| M.O.R. (kg/cm²) after 1 hr. at 1000° F (538° C): | — | 5200 | 4400 | — | 6400 | — | — | — | 6300 | 3400 | 3800 |
| after 4 hrs. at 900° F (482° C): | — | 5600 | 4800 | — | 6400 | — | — | — | 7200 | 3300 | 4100 |

| Example no.: | 611 | 614 | 615 | 621 | 623 | 624 | 625 | 626 | 627 | 628 | 629 |
|---|---|---|---|---|---|---|---|---|---|---|---|
| Composition (% by weight): | | | | | | | | | | | |
| $SiO_2$ | 50.5 | 45.5 | 46.5 | 47.0 | 39.5 | 45.0 | 44.5 | 44.5 | 42.5 | 44.5 | 43.5 |
| $Na_2O$ | 18.0 | 17.0 | 16.0 | 18.0 | 18.0 | 18.0 | 18.0 | 18.0 | 18.0 | 18.0 | 18.0 |
| $Al_2O_3$ | 4.0 | 10.0 | 10.0 | 10.0 | 10.0 | 10.0 | 10.0 | 10.0 | 10.0 | 10.0 | 10.0 |
| MgO | | | | | | 2.5 | 4.0 | 1.0 | | 2.0 | |
| $K_2O$ | 3.0 | 3.0 | 3.0 | 3.0 | 3.0 | 3.0 | 3.0 | 3.0 | 3.0 | 3.0 | 3.0 |
| $ZrO_2$ | 4.5 | 4.5 | 4.5 | 4.5 | 4.5 | 4.5 | 4.5 | 4.5 | 4.5 | 4.5 | 4.5 |
| $P_2O_5$ | 15.0 | 15.0 | 15.0 | 12.5 | 15.0 | 15.0 | 15.0 | 15.0 | 15.0 | 15.0 | 15.0 |
| CaO | 5.0 | 5.0 | 5.0 | 5.0 | 5.0 | 2.5 | 1.0 | 4.0 | | 3.0 | 3.0 |
| SrO | | | | | | | | | 7.0 | | 3.0 |
| $TiO_2$ | | | | | 2.0 | | | | | | |
| $CeO_2$ | | | | | 2.0 | | | | | | |
| CuO | | | | | 1.0 | | | | | | |
| Appearance: | Opal | Opal | Opal | Opal | Opal (blue) | Very Cloudy | Cloudy | Opal | Opal | Very Cloudy | Opal |
| Compression layer depth (microns) after 1 hr. at 1000° F (538° C): | 85 | — | — | 90 | — | 110 | — | — | 110 | — | — |
| M.O.R. (kg/cm²) after 1 hr. at 1000° F (538° C): | 4400 | 6200 | 4600 | 4900 | 5900 | 5000 | — | — | 5300 | — | — |
| after 4 hrs. at 900° F (482° C): | 4400 | 6100 | 5600 | 5900 | 5700 | 6100 | — | — | 6100 | — | — |
| Annealing point (° C): | — | — | — | — | — | — | — | — | 642 | — | — |

| Example no.: | 630 | 631 | 632 | 633 | 635 | 641 | 644 | 679 | 680 | 681 | 682 |
|---|---|---|---|---|---|---|---|---|---|---|---|
| Composition (% by weight): | | | | | | | | | | | |
| $SiO_2$ | 44.5 | 44.5 | 44.5 | 42.5 | 44.5 | 44.5 | 42.5 | 42.35 | 44.2 | 43.34 | 44.35 |
| $Na_2O$ | 18.0 | 18.0 | 18.0 | 18.0 | 18.0 | 10.0 | 10.0 | 18.0 | 18.0 | 18.0 | 18.0 |
| $Al_2O_3$ | 10.0 | 10.0 | 10.0 | 10.0 | 10.0 | 10.0 | 10.0 | 10.0 | 10.0 | 10.0 | 10.0 |
| MgO | 1.5 | | | | | 2.0 | 3.0 | | | | |
| $K_2O$ | 3.0 | 3.0 | 3.0 | 3.0 | 3.0 | 11.0 | 11.0 | 3.0 | 3.0 | 3.0 | 3.0 |
| $ZrO_2$ | 4.5 | 4.5 | 4.5 | 4.5 | 4.5 | 4.5 | 4.5 | 4.5 | 4.5 | 4.5 | 4.5 |
| $P_2O_5$ | 15.0 | 15.0 | 15.0 | 15.0 | 15.0 | 15.0 | 15.0 | 15.0 | 15.0 | 15.0 | 15.0 |
| CaO | 3.5 | 5.0 | 5.0 | 7.0 | 2.0 | 3.0 | | 2.0 | 2.0 | 2.0 | 2.0 |
| SrO | | | | | 3.0 | | 2.0 | 5.0 | 3.0 | 4.0 | 3.0 |
| $Cr_2O_3$ | | | 0.3 | 0.3 | | | | | 0.15 | 0.15 | 0.05 |
| CuO | | | | | | | | | | | 0.10 |
| CoO | | | | | | | | | | 0.01 | |
| Appearance: | Very Cloudy | Opal | Opal (green) | Opal (green) | Opal | Essent. Opal | Opal | Opal (blue) | Opal (green) | Opal (green) | Opal (green) |
| Compression layer depth (microns) after 1 hr. at 1000° F (538° C): | 110 | 125 | — | 115 | — | — | — | 110 | 120 | 120 | — |
| M.O.R. (kg/cm²) after 1 hr. at 1000° F (538° C): | — | 4900 | 6000 | 5800 | — | 3500 | — | 5300 | 5500 | 5500 | 5800 |
| after 4 hrs. at 900° F (482° C): | — | 5500 | 6600 | 5900 | — | 3500 | — | 6400 | 6500 | 6900 | 5800 |
| Annealing point (° C): | — | — | — | — | — | — | — | — | 649 | — | — |
| Melting temperature (° C): | — | — | — | — | — | — | 1469 | — | 1441 | — | — |
| Forming temperature (° C): | — | — | — | — | — | — | — | — | 1084 | — | — |

| Example no.: | 683 | 684 | 685 | 691 | 707 | 708 | 709 | 710 | 744 | 746 | 747 |
|---|---|---|---|---|---|---|---|---|---|---|---|
| Composition (% by weight): | | | | | | | | | | | |
| $SiO_2$ | 46.0 | 44.43 | 44.43 | 39.5 | 47.0 | 49.5 | 48.5 | 47.0 | 54.2 | 50.2 | 54.7 |
| $Na_2O$ | 18.0 | 18.0 | 18.0 | 18.0 | 18.0 | 18.0 | 18.0 | 18.0 | 18.0 | 18.0 | 18.0 |
| $Al_2O_3$ | 10.0 | 10.0 | 10.0 | 15.0 | 10.0 | 10.0 | 10.0 | 10.0 | | | |
| $K_2O$ | 3.0 | 3.0 | 3.0 | 3.0 | 3.0 | 3.0 | 3.0 | 3.0 | — | 4.0 | 4.0 |
| $ZrO_2$ | 4.5 | 4.5 | 4.5 | 4.5 | 4.5 | 4.5 | 4.5 | 4.5 | 3.0 | 3.0 | 3.0 |
| $P_2O_5$ | 15.0 | 15.0 | 15.0 | 15.0 | 15.0 | 10.0 | 11.0 | 12.5 | 4.5 | 4.5 | — |
| CaO | 1.5 | 2.0 | 3.0 | 5.0 | 12.5 | 5.0 | 3.0 | 5.0 | 15.0 | 15.0 | 15.0 |
| SrO | 2.0 | 3.0 | 2.0 | | | | 2.0 | | 3.0 | 5.0 | 5.0 |
| CuO | | | | | | | | | 2.0 | | |
| $Cr_2O_3$ | | 0.05 | 0.05 | | | | | | 0.15 | 0.15 | 0.15 |
| Appearance: | Essent. Opal | Opal (blue) | Opal (blue-green) | Opal | Opal | Opal | Opal | Opal | Opal (green) | Opal (green) | Opal |
| Compression layer depth (microns) after 1 hr. at 1000° F (538° C): | — | — | 120 | 110 | — | — | — | — | — | — | — |
| M.O.R. (kg/cm²) after 1 hr. at 1000° F (538° C): | — | 5500 | 5200 | 6500 | 5800 | 4800 | — | 5400 | 3200 | — | — |
| after 4 hrs. at 900° F (482° C): | — | 6700 | 6400 | 7300 | 6300 | 5800 | — | 6400 | 3800 | — | — |
| Annealing point (° C.) | — | — | 651 | — | — | — | — | — | — | — | — |

| Example no.: | 748 | 749 | 750 | 751 | 752 | 759 |
|---|---|---|---|---|---|---|
| Composition (% by weight): | | | | | | |
| $SiO_2$ | 36.5 | 45.5 | 41.0 | 64.5 | 59.5 | 59.5 |
| $Na_2O$ | 18.0 | 10.0 | 18.0 | 18.0 | 18.0 | 18.0 |
| $Al_2O_3$ | 15.0 | 10.0 | 18.0 | | | |
| MgO | | 2.0 | | | | |
| $K_2O$ | 3.0 | 11.0 | 3.0 | 3.0 | 3.0 | |
| $ZrO_2$ | 4.5 | 4.5 | | 4.5 | 4.5 | 4.5 |
| $P_2O_5$ | 18.0 | 15.0 | 15.0 | 5.0 | 10.0 | 13.0 |
| CaO | 5.0 | 2.0 | 5.0 | 5.0 | 5.0 | 5.0 |

-continued

| Appearance: | Opal | Essent. | Opal | Clear | Cloudy | Opal | | | | |
|---|---|---|---|---|---|---|---|---|---|---|
| M.O.R. (kg/cm²) | | | | | | | | | | |
| after 1 hr. at 1000° F (538° C): | | | 4500 | 400 | 400 | 1700 | | | | |
| after 4 hrs. at 900° F (482° C) | | | 6000 | 700 | 1700 | 2400 | | | | |
| Example no.: | 760* | 762 | 763 | 764 | 765 | 766 | 767 | 768 | 769 | 770 | 790 |
| Composition (% by weight): | | | | | | | | | | | |
| SiO₂ | 59.5 | 62.5 | 45.5 | 40.5 | 44.5 | 44.0 | 42.5 | 39.0 | 42.5 | 39.5 | 39.1 |
| Na₂O | 18.0 | 16.0 | 6.0 | 18.0 | 18.0 | 18.0 | 18.0 | 18.0 | 20.0 | 23.0 | 18.1 |
| Al₂O₃ | — | — | 10.0 | 10.0 | 4.5 | — | 10.0 | — | 10.0 | 10.0 | 13.8 |
| MgO | — | — | 2.0 | — | — | — | — | — | — | — | — |
| K₂O | — | — | 15.0 | 3.0 | 3.0 | 3.0 | 3.0 | 3.0 | 3.0 | 3.0 | 3.0 |
| ZrO₂ | 4.5 | 3.5 | 4.5 | 4.5 | 10.0 | 15.0 | 4.5 | 20.0 | 4.5 | 4.5 | 6.0 |
| P₂O₅ | 10.0 | 13.0 | 15.0 | 15.0 | 15.0 | 15.0 | 10.0 | 15.0 | 15.0 | 15.0 | 15.0 |
| CaO | 8.0 | 5.0 | 2.0 | 8.0 | 5.0 | 5.0 | 2.0 | 5.0 | 5.0 | 5.0 | 5.0 |
| SrO | — | — | — | — | — | — | 10.0 | — | — | — | — |
| Appearance: | Opal | Opaque lumpy | Essent. Opal | Opal cracks | Opal | Essent. Opal | Opal | Essent. Opal | Opal dull surface | Essent. opal-dull | Opal |

*Difficult to form

Which of these opal glass examples may be considered the most preferred depends upon the particular application for which the glass is intended and the importance placed upon each of the various parameters. One fully opalized composition which combines a number of desirable properties and appears to be suitable for a variety of uses is Example No. 547. The relative merits of such a composition may be seen by comparing it with a standard, commercially available, clear, ion-exchange glass sold by Corning Glass Works under the name "Chemcor".

| | Example 547 | Commercial Ion-Exchange Glass |
|---|---|---|
| Composition: | | |
| SiO₂ | 44.5 | 61.91 |
| Na₂O | 18.0 | 12.58 |
| K₂O | 3.0 | 3.46 |
| Al₂O₃ | 10.0 | 17.43 |
| ZrO₂ | 4.5 | 0.02 |
| P₂O₅ | 15.0 | — |
| CaO | 5.0 | 0.15 |
| MgO | — | 3.46 |
| TiO₂ | — | 0.63 |
| Appearance | Opal | Clear |
| Annealing point, ° C: | 654 | 627 |
| Melting Temp., ° C: | 1422 | 1750 (est.) |
| M.O.R. (kg/cm²) | | |
| (KNO₃ 1 hr., 538° C.): | 5900 | 5300 |
| KNO₃ 4 hrs., 482° C.): | 6000 | 6600 |
| Compression layer depth (microns) in KNO₃ at 538° F | | |
| after 1 hr: | 110 | 65 |
| after 2 hrs: | 150 | 85 |
| after 4 hrs: | 210 | 110 |
| after 7¼ hrs: | 285 | 155 |

The melting temperature of the commercial ion exchange glass could not be measured directly, but was estimated by extrapolating obtainable viscosity data.

The effect of the ion exchange treatment on glass strength may be seen in the following comparison of M.O.R. values before and after treatment:

| | No Ion Exchange | After Ion Exchange | |
|---|---|---|---|
| | | (KNO₃, 1 hr., 538° C) | (KNO₃, 4 hrs., 582° C) |
| Example 547 | 880 kg/cm² | 6000 kg/cm² | 6000 kg/cm² |
| Example 569 | 750 kg/cm² | 5600 kg/cm² | 6500 kg/cm² |
| Float glass* | 460 kg/cm² | 690 kg/cm² | 820 kg/cm² |

*Float glass composition (by weight): 73.2% SiO₂, 13.7% Na₂O, 0.03% K₂O, 8.9% CaO, 3.9% MgO, 0.1% Al₂O₃, 0.2% SO₃, 0.1% Fe₂O₃.

Thermal tempering of conventional clear glass such as the float glass above can approximately double its M.O.R., or increase the M.O.R. to a value typically in the area of about 1700 kg/cm² or more. The novel glasses of the present invention can be strengthened at least as much with an ion exchange treatment of one hour or less. As shown in the foregoing Examples, the preferred glass compositions can develop compression layer depths in excess of 50 microns, and in many cases in excess of 100 microns, after a one hour treatment. In order to achieve a minimum ion exchange strengthening effect, however, the compression layer need extend only beyond the deepest penetration of any surface defects, which can be estimated as about five microns in the case of a glass plate subjected to reasonably careful handling.

The chemical durability of the glasses of Examples 547, 569, and 602 were compared with that of a clear commercially available sheet glass having the following composition by weight of the oxide basis: 73 percent SiO₂, 13.3 percent Na₂O, 8.2 percent CaO, 3.7 percent MgO, 1.2 percent Al₂O₃, 0.1 percent Fe₂O₃, 0.2 percent SO₃. Two inch (5 centimeter) square ground and polished plates, 0.1 inch (2.5 millimeters) thick, of the 547, 569, and 602 glasses were first ion exchanged for one hour at 538° C. in molten KNO₃. The sheet glass sample was not ion exchanged. Samples of each of the glasses were immersed in boiling 0.5 percent by weight H₂SO₄; other samples of the glasses were immersed in boiling 0.1 Normal NaOH. After 30 minutes the samples were removed from the solutions and measured for weight loss, with the following results:

| | Example 547 | Example 569 | Example 602 | Sheet Glass | Example 545 |
|---|---|---|---|---|---|
| Weight loss in H₂SO₄ (milligrams per square centimeter): | 0.008 | 0.006 | 0.005 | 0.005 | 0.068 |
| Weight loss in NaOH (milligrams per square centimeter): | (not performed) | 0.045 | (not performed) | 0.080 | (not performed) |

Weight loss in acid for Example 545 is also given above for comparison, but cannot be directly compared with the other data since the 545 glass was in the form of a cast disc which was not ground and polished. Grinding and polishing, however, tend to worsen the chemical durability of these glasses, and thus it is significant that even in the as-cast form, the 545 glass showed the poorest acid durability in the above comparison. This is apparently attributable to the high $P_2O_5$ content of the 545 glass. These results show the novel compositions to have chemical durability comparable to sheet glass, rendering them suitable for use in a wide variety of applications.

Glasses which may be expected to have characteristics very similar to Example 547 as to opalesence, speed of ion exchange, strength, melting, temperature, and chemical durability will have the following essential composition (percent by weight, oxide basis):

| | |
|---|---|
| $SiO_2$ | 39 to 51% |
| $Na_2O$ | 15 to 18 |
| $K_2O$ | 1 to 4 |
| $(Na_2O + K_2O)$ | 19 to 22 |
| $Al_2O_3$ | 4 to 13 |
| $ZrO_2$ | 1 to 5 |
| $P_2O_5$ | 10 to 18 |
| CaO | 0 to 7 |
| SrO | 0 to 7 |
| (CaO + SrO) | 5 to 7. |

The details of the process by which the ion exchange treatment is carried out are well known in the art and need not be elaborated upon in great length here. In general, it can be said that the type of ion exchange treatment to which this invention pertains is limited to temperatures below the strain point of the glass, but it should be understood that temperatures at, or slightly above, the strain point are permissible as long as the glass does not remain at such a temperature for sufficient length of time to cause appreciable relaxation of the induced compression at the surface of the glass. In other words, exchange bath temperature may be slightly above the strain point if the treatment time is short. In some cases, it is preferred that the highest temperature possible be used in order to shorten treatment time; in other cases it is desirable to ion-exchange more slowly to obtain greater strength. Typically temperatures on the order of 400° to 600° C. are employed. In addition to $KNO_3$, other molten salts of potassium may constitute the exchange bath, such as chloride, fluoride, or phosphate salts. Other methods of contacting the glass with the exchange medium besides immersing in a molten salt bath have been proposed. These include spraying and coating with a carrier, and may be adaptable to the ion exchange treatment of the glass compositions disclosed herein.

Other modifications and variations as are known in the art may be resorted to without departing from the spirit and scope of the invention as defined by the appended claims.

I claim:

1. A spontaneously opalized glass capable of being strengthened by ion-exchange with potassium ions, comprising by weight on the oxide basis:
   34 to 60 percent $SiO_2$
   6 to 23 percent $Na_2O$
   0 to 15 percent $K_2O$
   18 to 26 percent $(Na_2O + K_2O)$
   0 to 18 percent $Al_2O_3$
   0 to 20 percent $ZrO_2$
   4 to 21 percent $(Al_2O_3 + ZrO_2)$
   7 to 20 percent $P_2O_5$
   0 to 9 percent CaO
   0 to 9 percent SrO
   2 to 9 percent (CaO + SrO)
   less than 0.1 percent $Li_2O$
   said constituents comprising at least 90 percent by weight of the glass and proportioned relative to one another so as to provide the glass with a viscosity of 100 poises at a temperature less than 2800° F. (1538° C.).

2. The glass of claim 1 comprising by weight on the oxide basis:
   38 to 60 percent $SiO_2$
   10 to 18 percent $Na_2O$
   0 to 11 percent $K_2O$
   18 to 23 percent $(Na_2O + K_2O)$
   4 to 18 percent $Al_2O_3$
   0 to 10 percent $ZrO_2$
   4 to 20 percent $(Al_2O_3 + ZrO_2)$
   10 to 20 percent $P_2O_5$
   0 to 9 percent CaO
   0 to 9 percent SrO
   4 to 9 percent (CaO + SrO).

3. The glass of claim 1 wherein the glass consists essentially of by weight on the oxide basis:
   39 to 51 percent $SiO_2$
   15 to 18 percent $Na_2O$
   1 to 4 percent $K_2O$
   19 to 22 percent $(Na_2O + K_2O)$
   4 to 13 percent $Al_2O_3$
   1 to 5 percent $ZrO_2$
   10 to 18 percent $P_2O_5$
   0 to 7 percent CaO
   0 to 7 percent SrO
   5 to 7 percent (CaO + SrO).

4. A chemically strengthened, spontaneously opalized glass article exhibiting a surface compressive stress after being subjected to surface abrasion composed of an interior portion which is in tension and surface compressive layer, said interior portion comprised of by weight on the oxide basis:
   34 to 60 percent $SiO_2$
   6 to 23 percent $Na_2O$
   0 to 15 percent $K_2O$
   18 to 26 percent $(Na_2O + K_2O)$
   0 to 18 percent $Al_2O_3$
   0 to 20 percent $ZrO_2$
   4 to 21 percent $(Al_2O_3 + ZrO_3)$
   7 to 20 percent $P_2O_5$
   0 to 9 percent CaO
   0 to 9 percent SrO
   2 to 9 percent (CaO + SrO)
   less than 0.1 percent $Li_2O$
   said constituents comprising at least 90 percent by weight of said interior portion and proportioned relative to one another so as to provide the glass with a viscosity of 100 poises at a temperature less than 2800° F. (1538° C.), and said surface layer having a higher content of $K_2O$ and a lower content of $Na_2O$ than the interior portion.

5. The glass article of claim 4 wherein said interior portion is comprised of by weight on the oxide basis:
   38 to 60 percent $SiO_2$
   10 to 18 percent $Na_2O$ 0 to 11 percent $K_2O$
18 to 23 percent $(Na_2O + K_2O)$
4 to 18 percent $Al_2O_3$
0 to 10 percent $ZrO_2$
4 to 20 percent $(Al_2O_3 + ZrO_2)$
10 to 20 percent $P_2O_5$
0 to 9 percent CaO
0 to 9 percent SrO
4 to 9 percent (CaO + SrO).

6. The glass article of claim 4 wherein said interior portion consists essentially of by weight on the oxide basis:
39 to 51 percent $SiO_2$
15 to 18 percent $Na_2O$
1 to 4 percent $K_2O$
19 to 22 percent $(Na_2O + K_2O)$
4 to 13 percent $Al_2O_3$
1 to 5 percent $ZrO_2$
10 to 18 percent $P_2O_5$
0 to 7 percent CaO
0 to 7 percent SrO
5 to 7 percent (CaO + SrO).

7. The glass article of claim 4 wherein said surface compressive layer is at least 50 microns thick.

8. The glass article of claim 4 wherein the surface compressive layer is at least 100 microns thick.

9. The glass article of claim 4 wherein its strength, as measured by abraded rod modulus of rupture is at least 1700 kilograms per square centimeter.

10. A method of strengthening an opal glass article comprising the steps of:
   a. contacting a source of potassium ions with the surface of a spontaneously opalized glass article comprising by weight on the oxide basis:
   34 to 60 percent $SiO_2$
   6 to 23 percent $Na_2O$
   0 to 15 percent $K_2O$
   18 to 26 percent $(Na_2O + K_2O)$
   0 to 18 percent $Al_2O_3$
   0 to 20 percent $ZrO_2$
   4 to 21 percent $(Al_2O_3 + ZrO_2)$
   7 to 20 percent $P_2O_5$
   0 to 9 percent CaO
   0 to 9 percent SrO
   2 to 9 percent (CaO + SrO)
   less than 0.1 percent $Li_2O$
   said constituents comprising at least 90 percent by weight of the glass article and proportioned relative to one another so as to provide the glass with a viscosity of 100 poises at a temperature less than 2800° F. (1538° C.);
   b. heating said source of potassium ions while in contact with the glass to a temperature at which potassium ions from said source replace sodium ions in the glass, but essentially below the strain point of the glass, thereby creating a zone of compression at the surface of the glass which extends at least 5 microns into the glass; and
   c. removing the glass from contact with the potassium ion source.

11. The method of claim 10 wherein the opal glass article being stengthened initially comprises by weight on the oxide basis:
38 to 60 percent $SiO_2$
10 to 18 percent $Na_2O$
0 to 11 percent $K_2O$
18 to 23 percent $(Na_2O + K_2O)$
4 to 18 percent $Al_2O_3$
0 to 10 percent $ZrO_2$
4 to 20 percent $(Al_2O_3 + ZrO_2)$
10 to 20 percent $P_2O_5$
0 to 9 percent CaO
0 to 9 percent SrO
4 to 9 percent (CaO + SrO)
less than 0.1 percent $Li_2O$
said constituents comprising at least 90 percent by weight of the glass article.

12. The method of claim 10 wherein the opal glass article being strengthened initially comprises by weight on the oxide basis:
39 to 51 percent $SiO_2$
15 to 18 percent $Na_2O$
1 to 4 percent $K_2O$
19 to 22 percent $(Na_2O + K_2O)$
4 to 13 percent $Al_2O_3$
1 to 5 percent $ZrO_2$
10 to 18 percent $P_2O_5$
0 to 7 percent CaO
0 to 7 percent SrO
5 to 7 percent (CaO + SrO)
less than 0.1 percent $Li_2O$
said constituents comprising at least 90 percent by weight of the glass article.

13. The method of claim 10 wherein said contacting and heating steps are continued for no more than one hour and thereby produce a compression layer at least 50 microns deep at the surface of the glass.

14. The method of claim 13 wherein the compression layer produced is at least 100 microns deep.

15. The method of claim 13 wherein the abraded rod modulus of rupture for the glass is at least doubled by the ion exchange treatment.

16. The method of claim 10 wherein the source of potassium ions is a molten bath of $KNO_3$.

* * * * *